US006658525B1

(12) United States Patent
Huang et al.

(10) Patent No.: US 6,658,525 B1
(45) Date of Patent: Dec. 2, 2003

(54) CONCURRENT ACCESS OF AN UNSEGMENTED BUFFER BY WRITERS AND READERS OF THE BUFFER

(75) Inventors: Su-Hsuan Huang, Fishkill, NY (US); William Gole Tuel, Jr., Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 09/672,642

(22) Filed: Sep. 28, 2000

(51) Int. Cl.[7] .............................................. G06F 13/00
(52) U.S. Cl. ........................ 711/109; 711/150; 711/168
(58) Field of Search ................................. 711/109, 110, 711/147, 149, 150, 151, 168; 365/230.05

(56) References Cited

U.S. PATENT DOCUMENTS

| | | | |
|---|---|---|---|
| 4,766,534 A | | 8/1988 | DeBenedictis ............... 364/200 |
| 4,833,651 A | * | 5/1989 | Seltzer et al. ........... 365/189.07 |
| 4,891,788 A | * | 1/1990 | Kreifels ........................ 365/49 |
| 5,043,873 A | | 8/1991 | Muramatsu et al. ......... 364/200 |
| 5,276,842 A | * | 1/1994 | Sugita .......................... 711/149 |
| 5,379,399 A | * | 1/1995 | Conway-Jones et al. .... 326/105 |
| 5,502,655 A | * | 3/1996 | McClure ...................... 702/127 |
| 5,555,396 A | | 9/1996 | Alferness et al. ............ 395/474 |
| 5,588,117 A | | 12/1996 | Karp et al. ............. 395/200.03 |
| 5,606,686 A | | 2/1997 | Tarui et al. ................... 395/448 |
| 5,617,537 A | | 4/1997 | Yamada et al. ......... 395/200.01 |
| 5,642,495 A | | 6/1997 | Ammann et al. ............ 395/480 |
| 5,652,885 A | | 7/1997 | Reed et al. ................... 395/651 |
| 5,696,940 A | * | 12/1997 | Liu et al. ..................... 345/558 |
| 5,701,413 A | | 12/1997 | Zulian et al. ........... 395/200.02 |
| 5,745,731 A | * | 4/1998 | Kim et al. .................... 711/149 |
| 5,765,041 A | * | 6/1998 | Cherichetti et al. ........... 710/22 |
| 5,867,668 A | | 2/1999 | Spirakis et al. ......... 395/200.64 |
| 5,890,007 A | | 3/1999 | Zinguuzi ................ 395/800.06 |
| 5,930,484 A | | 7/1999 | Tran et al. ................... 395/287 |
| 5,956,748 A | * | 9/1999 | New ...................... 365/230.05 |
| 5,982,700 A | * | 11/1999 | Proebsting ............. 365/230.05 |
| 5,991,820 A | | 11/1999 | Dean .......................... 709/300 |
| 5,999,478 A | * | 12/1999 | Proebsting ............. 365/230.05 |
| 6,021,407 A | | 2/2000 | Meck et al. .................... 707/7 |
| 6,044,416 A | * | 3/2000 | Hasan .......................... 710/52 |
| 6,044,431 A | * | 3/2000 | Greenwood et al. ......... 365/219 |
| 6,052,327 A | * | 4/2000 | Reddy et al. .......... 365/230.05 |
| 6,061,771 A | | 5/2000 | Bobak et al. ................ 711/169 |
| 6,128,715 A | * | 10/2000 | Wang et al. ................... 710/61 |
| 6,269,413 B1 | * | 7/2001 | Sherlock ...................... 361/111 |
| 6,292,873 B1 | * | 9/2001 | Keaveny et al. ............. 711/149 |
| 6,304,924 B1 | * | 10/2001 | Varma .......................... 710/52 |
| 6,381,659 B2 | * | 4/2002 | Proch et al. ................... 703/13 |
| 6,389,490 B1 | * | 5/2002 | Camilleri et al. ....... 365/189.07 |

OTHER PUBLICATIONS

"Lock–Free Queue Management Schemem For Communication Between Two Processors," P. Capek, W. Chiu and W. Frazer, IBM Technical Disclosure Bulletin, vol. 23, No. 7A, Dec. 1980, pp. 3059–3060.

* cited by examiner

*Primary Examiner*—Hong Kim
(74) *Attorney, Agent, or Firm*—Lawrence D. Cutter, Esq.; Blanche E. Schiller, Esq.; Heslin Rothenberg Farley & Mesiti P.C.

(57) ABSTRACT

Data is written to an unsegmented buffer located within shared memory. While data is being written to the unsegmented buffer, at least a portion of the data is being read from the buffer. A counter is used to indicate how much space is available in the buffer to receive data. Further, the counter is employed to ensure that the reader does not advance beyond the writer.

52 Claims, 4 Drawing Sheets

CONCURRENT ACCESS OF AN UNSEGMENTED BUFFER BY WRITERS AND READERS OF THE BUFFER

TECHNICAL FIELD

This invention relates, in general, to data processing and, in particular, to simultaneously writing data to and reading data from an unsegmented buffer.

BACKGROUND ART

In various computing environments, such as parallel computing environments, processes communicate with one another via shared memory. In particular, data is passed from one process to another process via buffers located within the shared memory.

In one example, two fixed size buffers are used for the communication. A sending process writes to a first buffer completely filling the buffer, and then signals the receiver to read the completely filled buffer. Thereafter, the sending process switches to a second buffer and begins filling the second buffer. When that buffer is complete, the receiver switches to that buffer and the cycle continues. Thus, the receiver cannot read the data until an entire buffer is full. This significantly reduces concurrency.

In another example, a shared queue is used for the communication. A sending process writes a block of memory of a predefined size, and then posts that block onto the queue and starts another block. The sending process continues writing until the number of blocks to be written is exhausted. The receiving process looks at the queue and once a write block is complete and on the queue, the reader reads that block. After it is read, it is returned to the free list. In this example, the receiver cannot read the data until an entire block is written. Again, this reduces concurrency.

Based on the foregoing, a need still exists for a capability that provides efficient utilization of a shared buffer. A need exists for a capability that offers minimum contention between reads and writes of the same shared buffer, enhances concurrency and provides performance improvements.

SUMMARY OF THE INVENTION

The shortcomings of the prior art are overcome and additional advantages are provided through the provision of a method of concurrently accessing shared buffers by writers and readers of a computing environment. The method includes, for instance, writing data, by a writer of the computing environment, to an unsegmented buffer within a shared memory of the computing environment; and reading data, by a reader of the computing environment, from the unsegmented buffer simultaneous with at least a portion of the data being written to the unsegmented buffer.

In one embodiment, the writing includes determining whether space is available within the unsegmented buffer to receive the data; and writing the data to the unsegmented buffer when space is available, wherein an amount of data written to the unsegmented buffer is less than or equal to the available space.

In a further embodiment, the reading includes determining whether data is available to be read, and reading the data when it is available, wherein an amount of data read is less than or equal to the available data.

System and computer program products corresponding to the above-summarized methods are also described and claimed herein.

Advantageously, an aspect of the present invention permits simultaneous access of a buffer, by a write process and a read process on either one system or multiple systems, in which the buffer does not require data to be written to or read from the buffer on any predefined boundary. This simultaneous access enhances concurrency and system performance, and minimizes contention between writers and readers of the computing environment.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, concurrent access to a shared buffer of a computing environment is provided, in which data is read from the buffer, while data is also being written to the buffer. The reader can read along in the buffer, right behind the writer writing data to the buffer. The buffer is an unsegmented buffer, in which data need not be written to or read from the buffer in any particular predefined blocks or amounts. The amount of data to be written is arbitrary and is only constrained by the amount of available space in the buffer. Similarly, the amount of data to be read is arbitrary and is only constrained by the amount of available data to be read.

Figure 1:
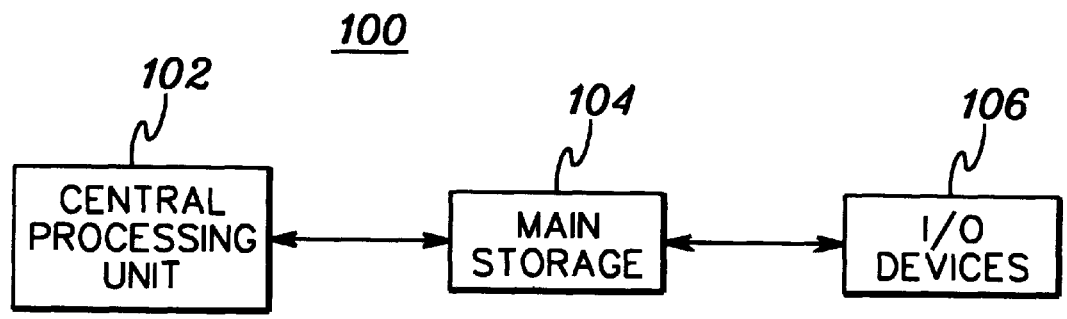
FIG. 1 depicts one example of a computing environment incorporating and using aspects of the present invention.

One embodiment of a computing environment incorporating and using aspects of the present invention is depicted and described in detail with reference to FIG. 1. In one example, computing environment 100 is a single system environment, which includes an RS/6000 computer system offered by International Business Machines Corporation, Armonk, N.Y. Computing environment 100 includes, for instance, at least one central processing unit 102, a main storage 104 and one or more input/output devices 106, each of which is described below.

Central processing unit (CPU) 102 contains the sequencing and processing facilities for instruction execution, interruption action, timing functions, initial program loading and other machine related functions. The central processing unit executes at least one operating system (such as AIX offered by International Business Machines Corporation), which as known, is used to control the execution of other programs, communication with peripheral devices, and use of the computer resources.

Central processing unit 102 is coupled to main storage 104, which is directly addressable and provides for high-speed processing of data by the central processing unit. Main storage 104 may be either physically integrated with the CPU or constructed in stand-alone units.

Main storage 104 is also coupled to one or more input/output devices 106. These devices include, for instance, keyboards, communication controllers, teleprocessing devices, printers, magnetic storage media (e.g., tape, disks), direct access storage devices and sensor based equipment. Data is transferred from main storage 104 to input/output devices 106, and from the input/output devices back to main storage.

The computing environment described above is only one example. The capabilities of the present invention can be incorporated and used with many types of computing environments and many types of computer systems. For example, other types of processors and/or operating systems may be used. Further, the invention is equally applicable to multiple node and/or multiple processor environments, such as Symmetric Multi-Processor (SMP) environments. (Various details of SMP are described in, for instance, co-pending U.S. patent application Ser. No. 09/604,310 entitled "Interrupt Mechanism For Shared Memory Message Passing", Patricia E. Heywood et al., filed Jun. 27, 2000, which is hereby incorporated herein by reference in its entirety.)

In one example, the computing environment is capable of running parallel jobs, in which tasks or processes of a job, running on either the same processor or multiple processors of one or more nodes, use shared memory to pass data (e.g., messages, other data, etc.) between the processes. In particular, the processes use a buffer within the shared memory to pass the data. For instance, one process sends a message to another process by writing data from its associated local memory to the shared buffer, and the other process, on the same processor or a different processor on the same or different node, receives the message by reading the data from the same shared buffer to its associated local memory. This shared buffer is, in accordance with an aspect of the present invention, concurrently accessible by the different processes writing data to and reading data from the shared buffer. Further details regarding the shared buffer are described with reference to FIG. 2.

Figure 2:
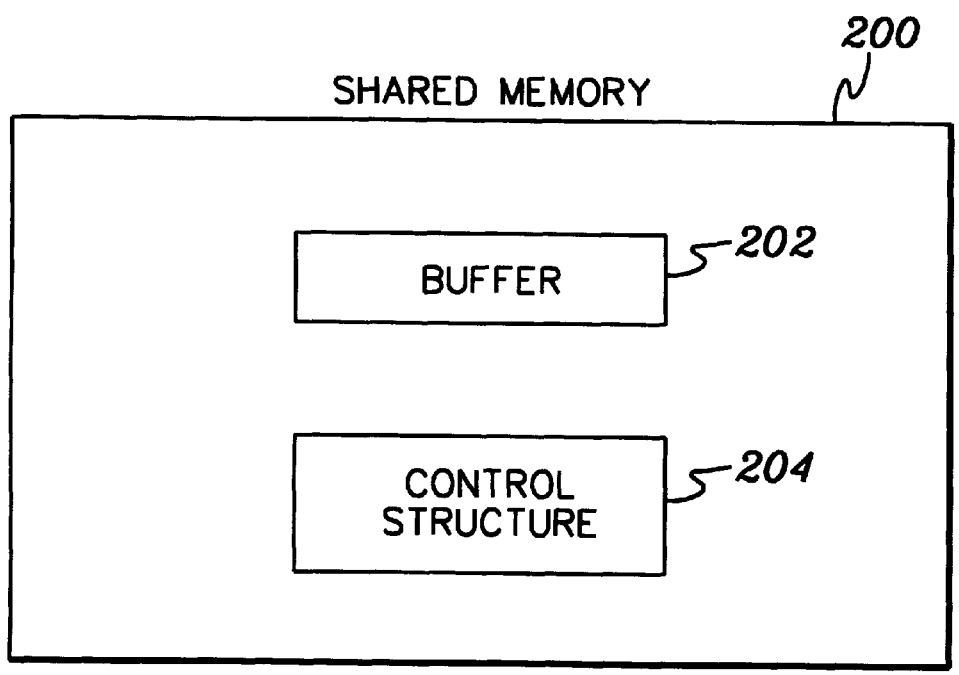
FIG. 2 depicts one embodiment of various components of shared memory used in accordance with an aspect of the present invention.

Referring to FIG. 2, a shared memory 200, which may be included within main storage 104 or in any type of external storage device or facility, includes, for instance, a shared buffer 202 and a control structure 204, each of which is described below.

In one example, buffer 202 (e.g., a First In, First Out (FIFO) pipe) is capable of receiving streams of data. That is, data can be written to and read from the buffer without adhering to any particular blocking boundaries (e.g, in increments of blocks, etc.) Data can be written to the buffer, as long as there is available space in the buffer to write the data. Further, data can be read from the buffer, as soon as and/or as long as there is data to be read. (One embodiment of a buffer is described in *Advanced Programming In The UNIX Environment*, by W. Richard Stevens, Addison Wesley Longman, Inc., 14th Printing, July, 1997, which is hereby incorporated herein by reference in its entirety.)

Figure 3:
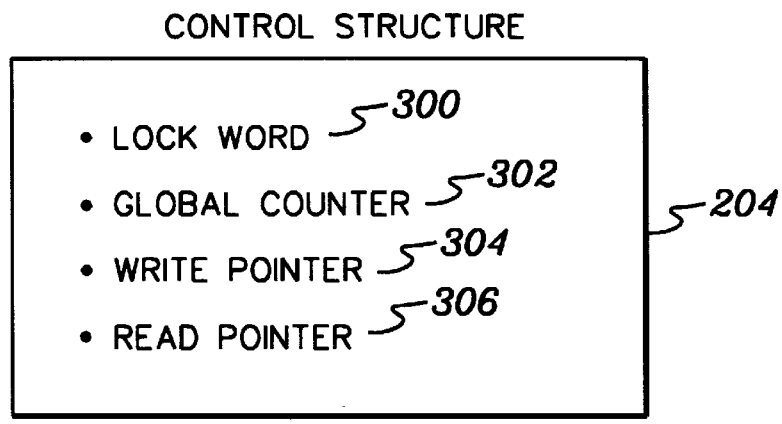
FIG. 3 depicts one example of a control structure of the shared memory of FIG. 2, used in accordance with an aspect of the present invention.

The writing of data to and the reading of data from the buffer is controlled by control structure 204. In one example, control structure 204 includes a lock word 300 (FIG. 3) for locking the control structure, such that only one process can update the control structure at any one time; a global counter 302 for tracking the number of bytes available for the writer to write in the shared buffer; a write pointer 304 for indicating the next address to be written in the shared buffer; and a read pointer 306 for indicating the next address to be read from the shared buffer. The use of the control structure is further described below with reference to the logic diagrams of FIGS. 4 and 5.

Figure 4:
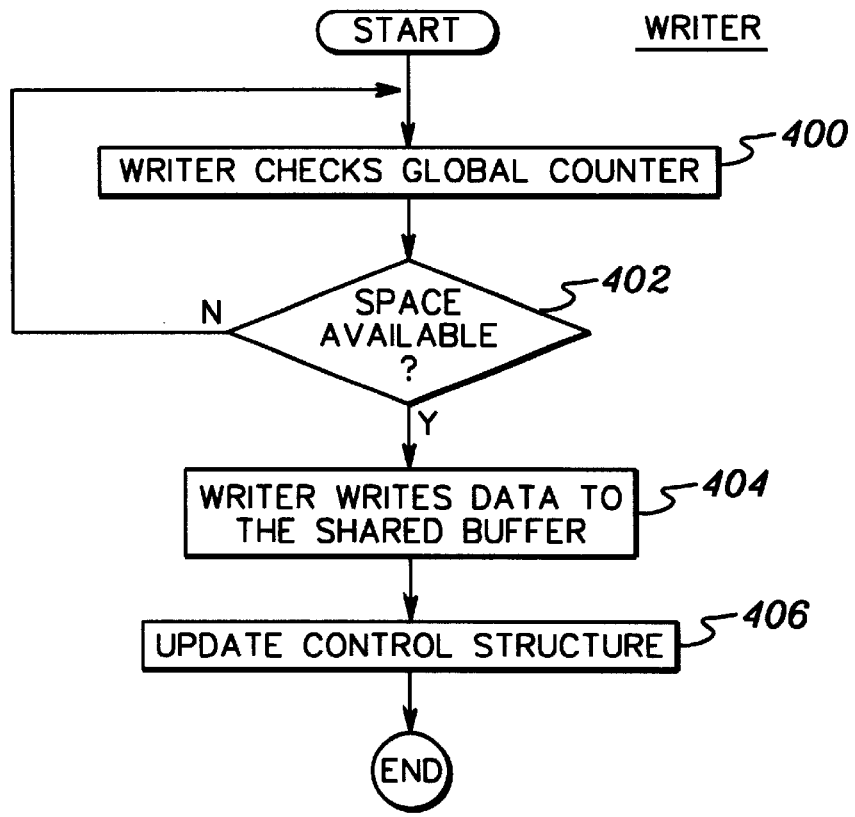
FIG. 4 depicts one embodiment of the logic associated with writing data to a buffer within the shared memory of FIG. 2, in accordance with an aspect of the present invention.
Figure 5:
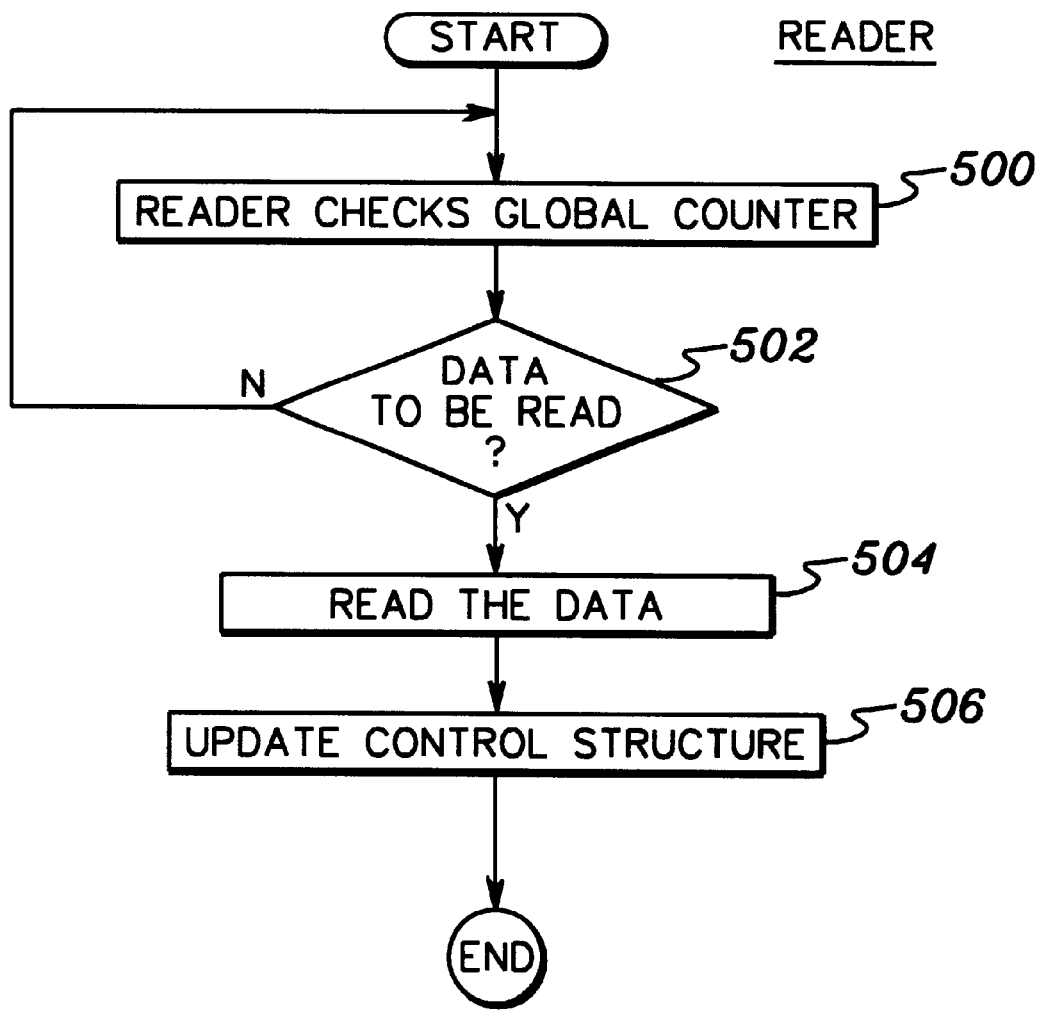
FIG. 5 depicts one embodiment of the logic associated with reading data from the buffer of FIG. 2, in accordance with an aspect of the present invention.

Referring to FIG. 4, one embodiment of the logic associated with writing data to the shared buffer is described in detail. Initially, the writer checks global counter 302 to determine if there is space available within the shared buffer to write data, STEP 400. If there is no space available, INQUIRY 402, then the writer waits and checks the global counter later. However, if there is space available, then the writer writes data to the shared buffer, starting at the position indicated by write pointer 304, STEP 404. The amount of data to be written to the shared buffer can be any amount of data, as long as it does not exceed the amount of space available. The data to be written does not have to be written in any predefined size of blocks or on any particular boundaries.

Subsequent to writing the desired amount of data to the shared buffer, the control structure is updated, STEP 406. In one example, the writer updates its write pointer 304 to point to the next address to be written in the shared buffer. Then, the writer updates global counter 302. In one example, in order to update the global counter, lock word 300 is obtained by the writer to atomically perform the update, such that the reader or any other process cannot be updating the control structure at the same time. The writer updates global counter 302 by subtracting the number of bytes written from the global counter. When the update is complete, the lock is released by releasing lock word 300. This completes one cycle of writing data to the shared buffer. The cycle can be continually repeated, as long as there is data to be written.

At any time, even while a writer is writing data to the shared buffer, a reader can read data from the buffer, as long as there is any data to be read. One embodiment of a reader reading the data from the shared buffer is described with reference to FIG. 5. Initially, the reader checks the global counter to determine the number of bytes available in the shared buffer for reading, STEP 500. In one example, this calculation is performed by subtracting the global counter from the pipe buffer size, which is known to both the reader and the writer. If there is no data to be read, then processing of the read is complete at this particular time. However, the reader can check the global counter at any time thereafter.

On the other hand, if there is data to be read, the reader reads a desired amount of the data from the shared buffer, commencing at the position indicated by read pointer 306, STEP 504. The amount of data to be read can be any amount of data, as long as it does not exceed the available data to be read. It does not have to be read in any predefined size of blocks or on any particular boundaries.

Subsequent to reading the desired amount of data from the shared buffer, the control structure is updated by the reader, STEP 506. In one example, the reader updates its read pointer 306 to point to the next address to be read. Then, the reader updates global counter 302 to reflect the amount of space available for writing. As with updating the global counter by the writer, in order to update the global counter by the reader, the reader obtains lock word 300. After obtaining the lock word, the global counter is updated by adding the number of bytes read to the global counter indicating that this space is free for the writer to continue sending data, if there is any. Thereafter, the lock word is released. This completes one cycle of reading data by the reader. Like the writing cycle, the reading cycle can be continually repeated, as long as there is data to be read.

In accordance with an aspect of the present invention, data can continue to be written to the buffer as long as there is available space in the buffer, and data can be read from the buffer as long as there is data to be read. Additionally, the control structure can be updated by the writer and/or reader as frequently as desired to reflect the current availability of the buffer. Typically, it is updated at selected intervals (e.g., after writing X number of bytes; after reading Y number of bytes). The intervals are selected to maximize concurrency and throughput (allowing the reader to empty the buffer, while the writer is filling the buffer), without degrading system performance.

Several examples of a shared buffer and its associated pointers are described with reference to FIGS. 6a–9.

Figure 6A:
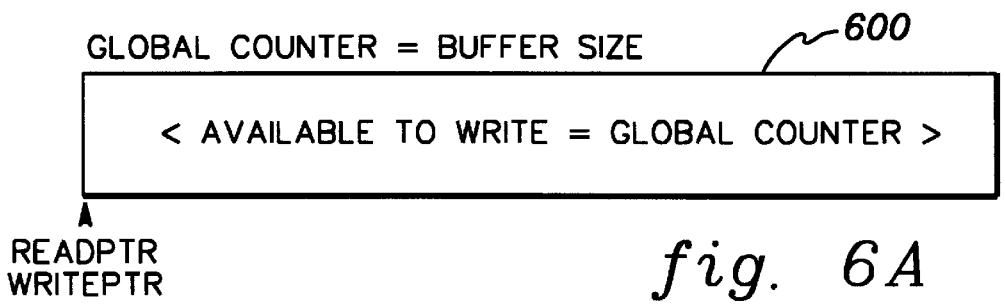
FIGS. 6a–9 depict examples of the buffer of FIG. 2 and its associated pointers, in accordance with an aspect of the present invention.

Referring to FIG. 6a, a shared buffer 600 is shown, in which the global counter is equal to the buffer size. In this case, no data has yet been written to the buffer. Thus, data can be written to the entire buffer. Since data has not been written and thus, there is no data to be read, the read pointer and the writer pointer indicate the same location.

Figure 6B:
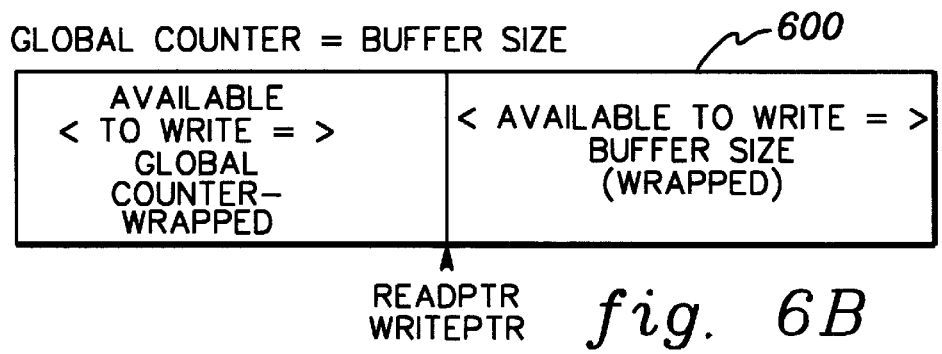

Similarly, in FIG. 6b, the global counter is equal to the buffer size, and thus, the entire buffer is available to be written. Again, in this case, the read pointer and writer pointer indicate the same location. However, in this embodiment, the pointers are depicted off of the left edge of the buffer to demonstrate that the shared buffer wraps, when the end of the buffer is reached.

Figure 7:
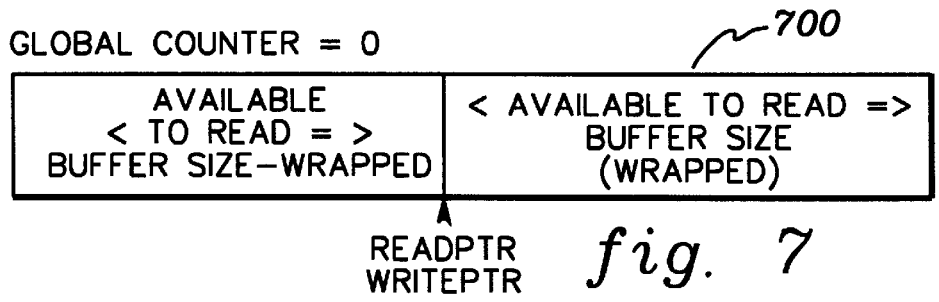

Referring to FIG. 7, a shared buffer 700 is depicted, in which the global counter is equal to zero and the read and write pointers are at the same location. This indicates that the buffer is full and thus, the entire buffer is available to read.

Figure 8:

Referring to FIG. 8, a shared buffer 800 is depicted, which has available space to be written into, as indicated by the global counter. In this example, since the write pointer is before the read pointer, the available space to write is the location between the two pointers. Further, the available space to read is equal to the buffer size minus the global counter.

Figure 9:

In the last example depicted in FIG. 9, a shared buffer 900 is depicted, in which there is also available space to be written, as indicated by the global counter. In this example, the write pointer is behind the read pointer and thus, the writer will wrap when it reaches the end of the buffer. The amount of space available to read is again equal to the buffer size minus the global counter.

The various examples described above demonstrate how a shared buffer can be concurrently accessed by both a writer and reader. The reader can follow right behind the writer reading the data written by the writer. This provides enhanced concurrency between writers and readers and provides a significant improvement in system performance.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of concurrently accessing shared buffers by writers and readers of a computing environment, said method comprising:

writing data, by a writer of said computing environment, to an unsegmented buffer within a shared memory of said computing environment, wherein an amount of time to write data by the writer is variable; and reading data, by a reader of said computing environment, from said unsegmented buffer simultaneous with at least a portion of the data being written to said unsegmented buffer.

2. The method of claim 1, wherein said shared memory is located within a main storage of said computing environment.

3. The method of claim 1, wherein said shared memory is located within an external storage of said computing environment.

4. The method of claim 1, wherein said writing comprises:

determining whether space is available within said unsegmented buffer to receive the data; and writing the data to said unsegmented buffer when space is available, wherein an amount of data written to the unsegmented buffer is less than or equal to the available space.

5. The method of claim 4, wherein said determining comprises checking a counter indicative of an amount of available space in the unsegmented buffer.

6. The method of claim 5, further comprising updating said counter in response to writing the data.

7. The method of claim 6, wherein said updating comprises subtracting from said counter a value representative of the amount of data written.

8. The method of claim 4, further comprising setting a write pointer to indicate a next position within said unsegmented buffer to write data.

9. The method of claim 1, wherein said reading comprises:

determining whether data is available to be read; and reading the data when it is available, wherein an amount of data read is less than or equal to the available data.

10. The method of claim 9, wherein said determining comprises subtracting from a size of the unsegmented buffer a value of a counter indicative of an amount of available space in the unsegmented buffer.

11. The method of claim 10, further comprising updating the counter in response to reading the data.

12. The method of claim 11, wherein said updating comprises adding to said counter a value representative of the amount of data read.

13. The method of claim 9, further comprising setting a read pointer to indicate a next position within said unsegmented buffer to read data.

14. The method of claim 1, wherein said writer and said reader are processes executing on a same processor of said computing environment.

15. The method of claim 1, wherein said writer and said reader are processes executing on different processors of said computing environment, and wherein said different processors are on the same node or different nodes of the computing environment.

16. A system of concurrently accessing shared buffers by writers and readers of a computing environment, said system comprising:

a writer of said computing environment writing data to an unsegmented buffer within a shared memory of said computing environment, wherein an amount of time to write data by the writer is variable, and a reader of said computing environment reading data from said unsegmented buffer simultaneous with at least a portion of the data being written to said unsegmented buffer.

17. The system of claim 16, wherein said shared memory is located within a main storage of said computing environment.

18. The system of claim 16, wherein said shared memory is located within an external storage of said computing environment.

19. The system of claim 16, wherein said writing by said writer comprises:

said writer determining whether space is available within said unsegmented buffer to receive the data; and said writer writing the data to said unsegmented buffer when space is available, wherein an amount of data written to the unsegmented buffer is less than or equal to the available space.

20. The system of claim 19, wherein said writer determining comprises said writer checking a counter indicative of an amount of available space in the unsegmented buffer.

21. The system of claim 20, further comprising said writer updating said counter in response to writing the data.

22. The system of claim 21, wherein said writer updating comprises said writer subtracting from said counter a value representative of the amount of data written.

23. The system of claim 19, further comprising said writer setting a write pointer to indicate a next position within said unsegmented buffer to write data.

24. The system of claim 16, wherein said reading by said reader comprises:

said reader determining whether data is available to be read; and said reader reading the data when it is available, wherein an amount of data read is less than or equal to the available data.

25. The system of claim 24, wherein said reader determining comprises said reader subtracting from a size of the unsegmented buffer a value of a counter indicative of an amount of available space in the unsegmented buffer.

26. The system of claim 25, further comprising said reader updating the counter in response to reading the data.

27. The system of claim 26, wherein said reader updating comprises said reader adding to said counter a value representative of the amount of data read.

28. The system of claim 24, further comprising said reader setting a read pointer to indicate a next position within said unsegmented buffer to read data.

29. The system of claim 16, wherein said writer and said reader are processes executing on a same processor of said computing environment.

30. The system of claim 16, wherein said writer and said reader are processes executing on different processors of said computing environment, and wherein said different processors are on the same node or different nodes of the computing environment.

31. A system of concurrently accessing shared buffers of a computing environment, said system comprising:

means for writing data to an unsegmented buffer within a shared memory of said computing environment, wherein an amount of time to write data is variable; and means for reading data from said unsegmented buffer simultaneous with at least a portion of the data being written to said unsegmented buffer.

32. The system of claim 31, wherein said means for writing comprises:

means for determining whether space is available within said unsegmented buffer to receive the data; and means for writing the data to said unsegmented buffer when space is available, wherein an amount of data written to the unsegmented buffer is less than or equal to the available space.

33. The system of claim 31, wherein said reading comprises:

means for determining whether data is available to be read; and means for reading the data when it is available, wherein an amount of data read is less than or equal to the available data.

34. The system of claim 31, wherein said means for writing comprises a writer and said means for reading comprises a reader, and wherein said writer and said reader are processes executing on a same processor of said computing environment.

35. The system of claim 31, wherein said means for writing comprises a writer and said means for reading comprises a reader, and wherein said writer and said reader are processes executing on different processors of said computing environment, and wherein said different processors are on the same node or different nodes of the computing environment.

36. At least one program storage device readable by a machine, tangibly embodying at least one program of instructions executable by the machine to perform a method of concurrently accessing shared buffers by writers and readers of a computing environment, said method comprising:

writing data, by a writer of said computing environment, to an unsegmented buffer within a shared memory of said computing environment, wherein an amount of time to write data by the writer is variable; and reading data, by a reader of said computing environment, from said unsegmented buffer simultaneous with at least a portion of the data being written to said unsegmented buffer.

37. The at least one program storage device of claim 36, wherein said shared memory is located within a main storage of said computing environment.

38. The at least one program storage device of claim 36, wherein said shared memory is located within an external storage of said computing environment.

39. The at least one program storage device of claim 36, wherein said writing comprises:
   determining whether space is available within said unsegmented buffer to receive the data; and
   writing the data to said unsegmented buffer when space is available, wherein an amount of data written to the unsegmented buffer is less than or equal to the available space.

40. The at least one program storage device of claim 39, wherein said determining comprises checking a counter indicative of an amount of available space in the unsegmented buffer.

41. The at least one program storage device of claim 40, wherein said method further comprises updating said counter in response to writing the data.

42. The at least one program storage device of claim 41, wherein said updating comprises subtracting from said counter a value representative of the amount of data written.

43. The at least one program storage device of claim 39, wherein said method further comprises setting a write pointer to indicate a next position within said unsegmented buffer to write data.

44. The at least one program storage device of claim 36, wherein said reading comprises:
   determining whether data is available to be read; and
   reading the data when it is available, wherein an amount of data read is less than or equal to the available data.

45. The at least one program storage device of claim 44, wherein said determining comprises subtracting from a size of the unsegmented buffer a value of a counter indicative of an amount of available space in the unsegmented buffer.

46. The at least one program storage device of claim 45, wherein said method further comprises updating the counter in response to reading the data.

47. The at least one program storage device of claim 46, wherein said updating comprises adding to said counter a value representative of the amount of data read.

48. The at least one program storage device of claim 44, wherein said method further comprises setting a read pointer to indicate a next position within said unsegmented buffer to read data.

49. The at least one program storage device of claim 36, wherein said writer and said reader are processes executing on a same processor of said computing environment.

50. The at least one program storage device of claim 36, wherein said writer and said reader are processes executing on different processors of said computing environment, and wherein said different processors are on the same node or different nodes of the computing environment.

51. The method of claim 1, wherein said reading commences after waiting a variable amount of time.

52. The method of claim 51, wherein the amount of time to write and the variable amount of time are different amounts of time.

* * * * *